US006031170A

United States Patent [19]

Hoshino

[11] Patent Number: 6,031,170

[45] Date of Patent: Feb. 29, 2000

[54] TIP STRUCTURE FOR SUPPORT LEG OF MUSICAL INSTRUMENT STAND

[75] Inventor: Yoshihiro Hoshino, Nagoya, Japan

[73] Assignee: Hoshino Gakki Kabushiki Kaisha, Nagoya, Japan

[21] Appl. No.: 09/149,783

[22] Filed: Sep. 8, 1998

[30] Foreign Application Priority Data

Feb. 12, 1998 [JP] Japan .................................. 10-048748

[51] Int. Cl.$^{7}$ ...................................................... G01D 13/02

[52] U.S. Cl. .......................................... 84/422.3; 84/422.2

[58] Field of Search ................................ 84/422.1, 422.2, 84/422.3

[56] References Cited

U.S. PATENT DOCUMENTS

| | | | |
|---|---|---|---|
| 3,901,258 | 8/1975 | Montgomery | 135/47 |
| 4,977,914 | 12/1990 | Smerker | 135/81 |
| 5,105,706 | 4/1992 | Lombardi | 84/422.3 |
| 5,785,287 | 7/1998 | Hoshino | 248/188.9 |

FOREIGN PATENT DOCUMENTS

| | | |
|---|---|---|
| 2322223 | 8/1998 | United Kingdom . |

*Primary Examiner*—Jeffrey Donels
*Assistant Examiner*—Shih-yung Hsieh
*Attorney, Agent, or Firm*—Ostrolenk, Faber, Gerb & Soffen, LLP

[57] ABSTRACT

The invention concerns a tip structure for a support leg for a stand. The stand may be used for supporting a musical instrument. The support leg has a main part with a bottom end. A bar receiving opening opens into the bottom end of the main support. An elongated hole is formed in the side of the support leg and communicates into the bar receiving opening. An end cap is fitted over the bottom end of the leg. The cap has a bottom opening that is aligned with the bar receiving opening at the bottom of the support leg. The cap has an adjustment groove along the side of the cap which overlies the elongated hole in the leg. A tip bar is inserted in the bar receiving opening in the leg and is projectable through the opening in the cap. A clamping screw extends through the adjustment groove in the side of the cap and through the elongated hole in the side of the leg and into the bar receiving opening inside the leg for being tightenable to clamp the bar at a selected position beyond the end of the cap and loosenable to permit adjustment of the clamping of the bar with respect to the cap. The musical instrument stand may include two of the support legs supported on a support for the musical instrument, which may be a cymbal.

8 Claims, 5 Drawing Sheets

TIP STRUCTURE FOR SUPPORT LEG OF MUSICAL INSTRUMENT STAND

BACKGROUND OF THE INVENTION

The present invention relates to a tip structure for a support leg for a stand for musical instruments.

EXAMPLE OF THE PRIOR ART

FIG. 6 shows a prior art high hat stand HA which is supported by three legs 41. It has a lower fixed cymbal 45 and an upper movable cymbal 46 at the top of the support 42. A performance is carried out by moving the upper movable cymbal 46 up and down through the operation of a foot pedal 50 at the bottom of the stand. There is a support base 43, an inner tube 44 that is adjustable in height inside the tube support 42 and that carries the lower cymbal 45, an operating rod 47 for the upper cymbal and a ground engaging member 48 below.

This high hat stand HA sometimes moves away from the performer, especially as the weight of the cymbals 45 and 46 increases, and due to the operation of the pedal 50 during a performance.

To prevent such movement, a cap 49 is fitted to the tip of each leg 41 and a spike bar 51 is provided having a tip 52 that sticks out at the bottom of the ground member 48. The tip 52 is brought into contact with the ground for preventing movement of the said high hat stand HA.

Because the spike bar 51 is provided on a support base 43 which constitutes the center of the stand surrounded by the three legs 41, if the length by which the tip 52 protrudes is small, the grounding force that applies to the tip 52 is reduced so that it will not prevent shifting. If the length of the tip protrusion is excessively large, on the other hand, one of the three legs 41 will be lifted and "float", reducing the stability of the high hat stand HA. Therefore, the length adjustment range of the tip 52 for shift prevention of the spike bar 51 is extremely small, demanding a severe adjustment precision.

Moreover, because the support base 43 on which the spike bar 51 is provided is the center at the bottom of the high hat stand HA, this makes it difficult to adjust the length of protrusion of the bar 51. As the high hat stand HA itself has to be raised or tilted, it is difficult for one person to do the adjustment.

SUMMARY OF THE INVENTION

The invention seeks to overcome the above problem. The tip structure of a new support leg is easily and simply adjustable by stabilizing the stand for the musical instrument and without causing shifting of the stand.

The invention concerns a tip structure for a support leg for a stand. The stand may be used for supporting a musical instrument. The support leg has a main part with a bottom end. A bar receiving opening opens into the bottom end of the support leg. An elongated hole is formed in the side of the support leg and communicates into the bar receiving opening. An end cap is fitted over the bottom end of the leg. The cap has a bottom opening that is aligned with the bar receiving opening at the bottom of the support leg. The cap has an adjustment groove along the side of the cap which overlies the elongated hole in the bar. A tip bar is inserted in the bar receiving opening in the leg and is projectable through the opening in the cap. A clamping screw extends through the adjustment groove in the side of the cap and through the elongated hole in the side of the leg and into the bar receiving opening inside the leg for being tightenable to clamp the bar at a selected position protruding beyond the end of the cap and loosenable to permit adjustment of the clamping of the bar with respect to the cap. The musical instrument stand may include two of the support legs supported on a support for the musical instrument, which may be a cymbal.

Other objects and features of the invention are explained with reference to the attached drawings.

DESCRIPTION OF A PREFERRED EMBODIMENT

Figure 1:
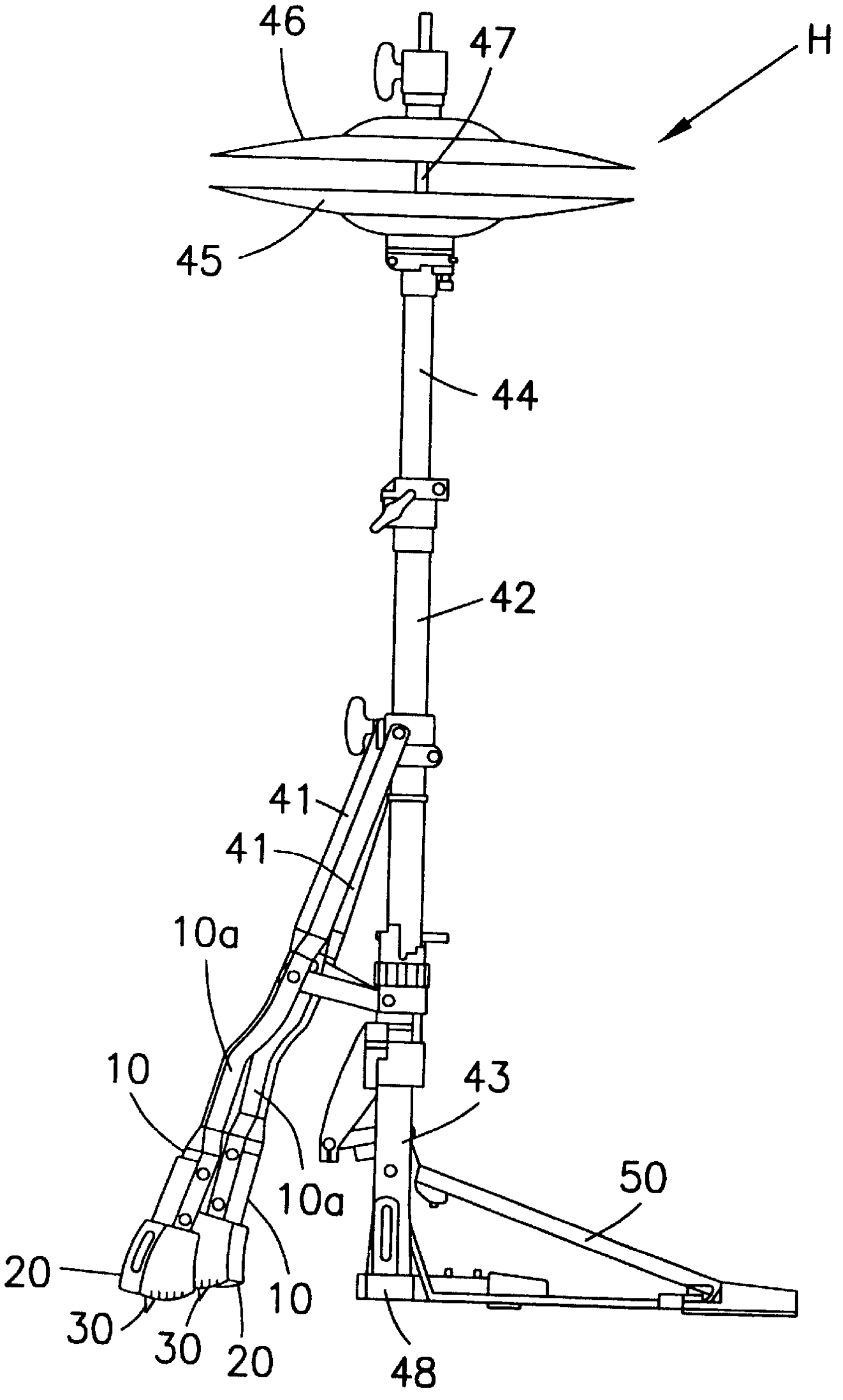
FIG. 1 shows a side view of a high hat stand having the tip structure of a support leg according to an embodiment of the invention.
Figure 6:
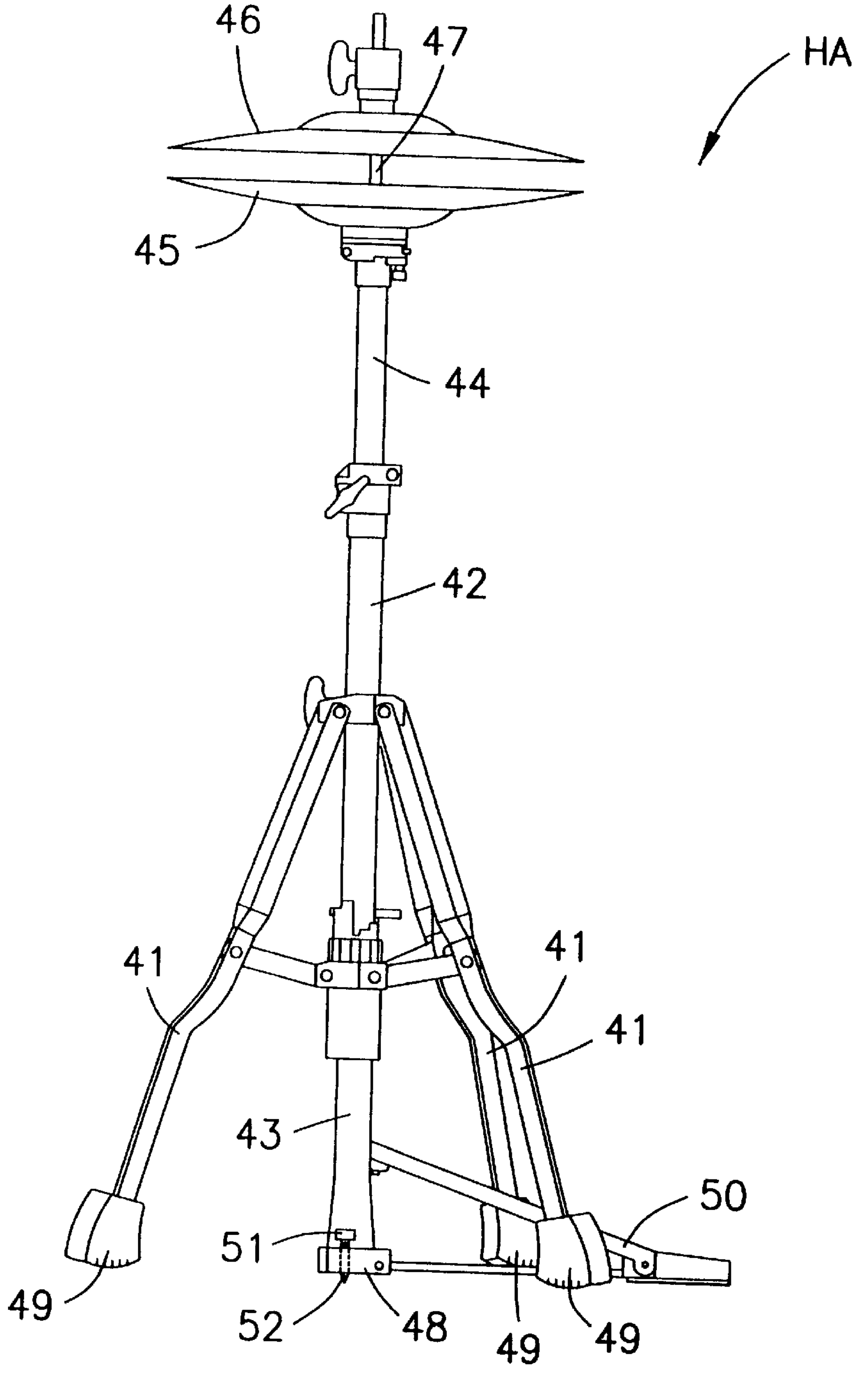
PRIOR ART FIG. 6
FIG. 6 is a side view of a prior art high hat stand.

This invention relates to the tip structure of a support leg for a musical instrument, such as a high hat stand, etc. The high hat stand H in FIG. 1 is different from the high hat stand HA of the prior art, because the stand H is supported by two standard support legs and by the central part of the stand as a third leg. However, this invention is not affected by this configuration of legs. The invention can also be used for a conventional high hat stand HA. In FIGS. 1–5, the same reference numbers are used as for the conventional hat stand HA in FIG. 6 to indicate the same parts.

The stand has two support legs 10. The main part 10*a* of each support leg is supported on both sides by the legs 41 that are installed on the support 42. An end cap 20 is fitted to the bottom tip of the main part 10*a* of the leg 10. A spike bar 30 is inserted through the end cap 20 into the support leg main part 10*a*. The tip 31 of the bar 30 is provided in such a fashion as to be able to protrude or disappear into the end of the tip.

Figure 2:
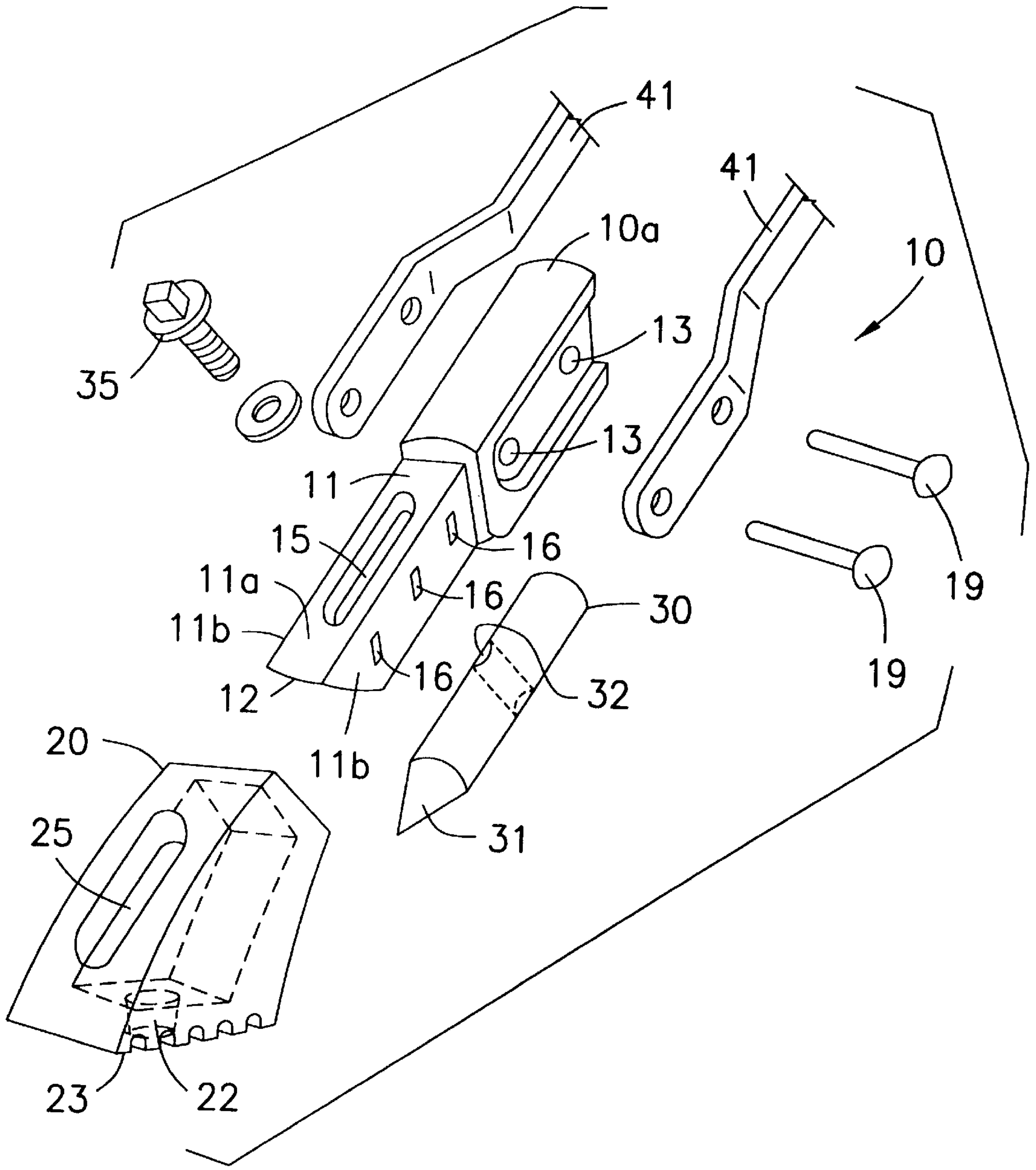
FIG. 2 is an oblique exploded view of the tip structure of the support leg.
Figure 3:
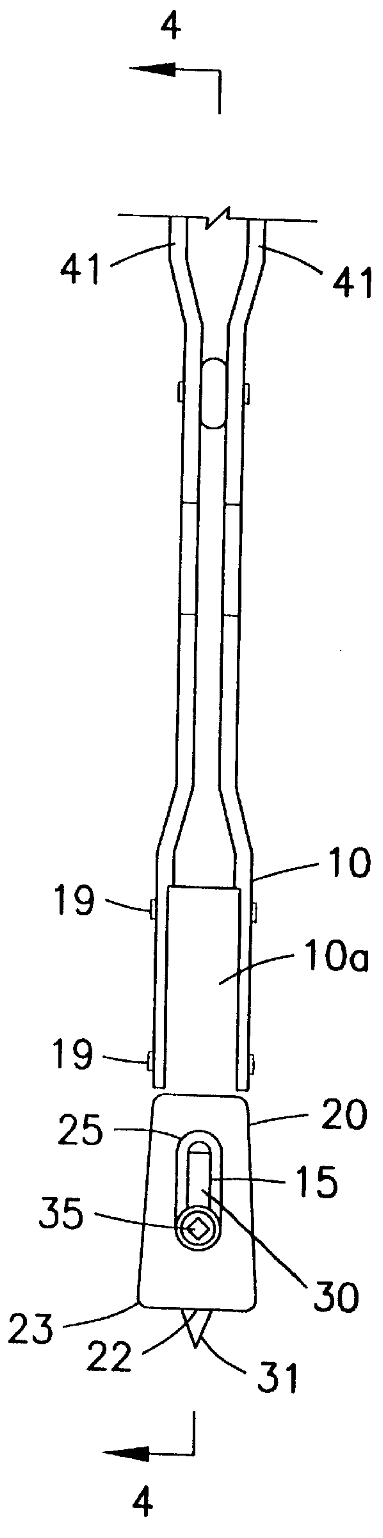
FIG. 3 is a front view of the tip structure with a tip protruding.
Figure 4:
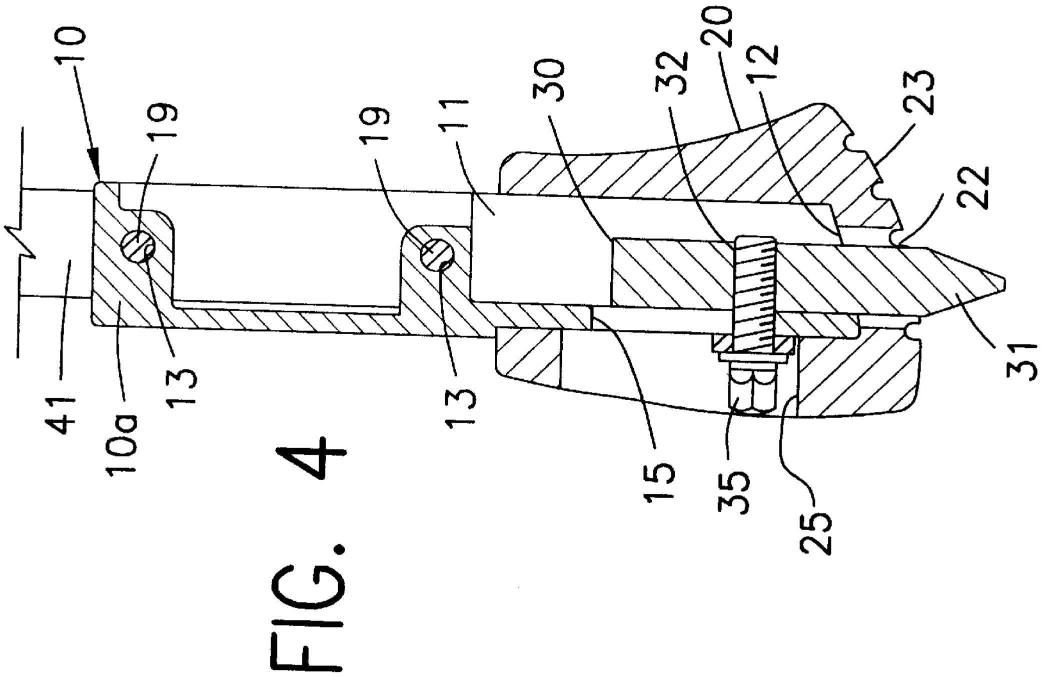
FIG. 4 is a cross section along line 4—4 in FIG. 3.
Figure 5:
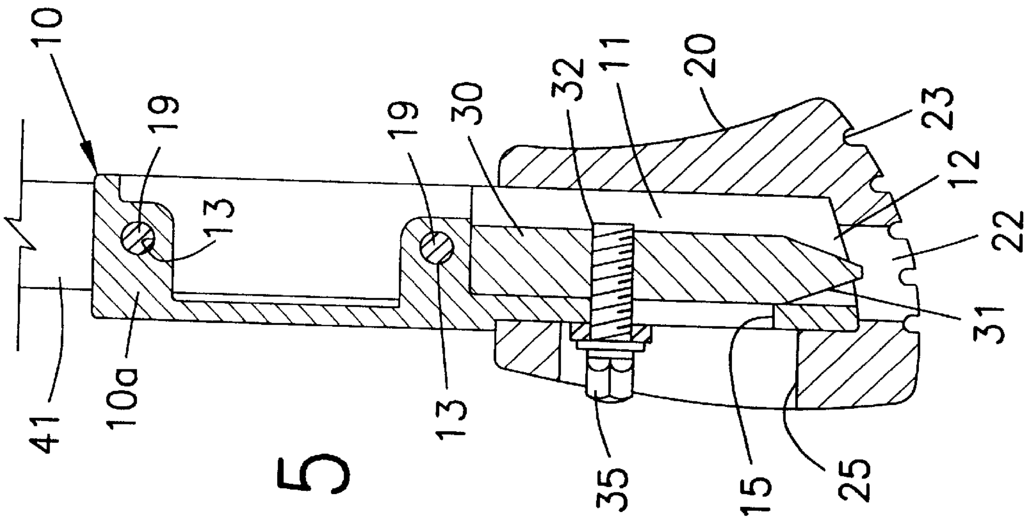
FIG. 5 is a cross section when the tip shown in FIG. 4 is being accommodated inside the end cap and support leg.

FIGS. 2 and 3 show that the main part 10*a* of the support leg is comprised of a tubular part 11, e.g., with a cross section in the shape of a U. It has a tip opening 12 at its bottom end. It is rivetted by fixing members 19 like rivets, etc. to the legs 41 at the insertion holes 13 that are formed at prescribed locations near the end of the main part 10*a* of the support leg. An elongated hole 15 is formed into the outer surface 11*a* near the tip of the tubular part 11. A plurality of protrusions 16 for preventing withdrawal of the end cap 20 are formed on the opposite sides 11*b* of the part 11.

The end cap 20 is made of rubber, or the like, which is effective in preventing both vibrations and sliding of the capped leg. The cap is provided on the outer periphery of the tip of the main part 10*a* of the support leg, and has a bottom opening 22 that corresponds to and is aligned with the tip opening 12. The periphery of the opening 22 is a grounding part 23 with a thread provided on it. In addition, an adjustment groove 25 is formed in a side of the cap at a position that corresponds to and overlies the elongated hole 15.

The spike bar 30 is comprised of metal, etc. and has a bottom end tip 31. The bar 30 is inserted in the tip opening 12 of the support leg main part 10*a* in a way to enable the tip to protrude or to disappear freely. The spike bar 30 has a screw hole 32 across it for receiving the adjustment screw member 35 which has been inserted through the adjustment groove 25 of the end cap 20 and through the elongated hole 15 of the tubular part 11. Tightening or loosening the adjustment screw member 35 enables the spike bar 30 to be either fixed or moved.

It is convenient to shape the head of the screw so that it may be operated by a tuning key like that used for tuning a musical instrument.

To adjust the support leg 10 spike bar 30, the adjustment screw 35 is loosened, and the spike bar 30 is moved up or down to adjust the length of the protrusion of the tip 31 from the opening 22 of the end cap 20. After setting the protrusion of the spike bar 30, the adjustment screw 35 is retightened at the location for engagement with the elongated hole 15 of the tubular part 11.

The support leg 10 enables preventing shifting of the stand by biting into the ground, which the high hat stand H contacts by the tip 31 of the spike bar 30 protruding from the ground engaging part 23 of the end cap 20.

In this embodiment, moreover, the legs 41 are provided on a side of the high hat stand H, which is away from the performer. As a result, the performer's stepping force on the operating pedal 50 is firmly applied to the support legs 10 of the legs 41, thereby increasing the force with which each spike bar 30 holds the ground.

The spike bars 30 of the support legs 10 protruding from the end caps 20 constitute two support points for the high hat stand H, whereby the high hat stand H is supported at three points, including the ground engaging member 48. Therefore, this enables stable support of the high hat stand H, irrespective of the length of the protrusion of the spike bar 30.

The tip structure of the support leg makes it necessary only to loosen the adjustment screw with a tuning key, to shift the screw to a prescribed location by the tuning key and to retighten the screw. Accordingly, adjustment of the protrusion length of the spike bar 30 can be carried out speedily and easily, and using one hand.

The tip structure of the support leg according to the invention is not limited to use on a high hat stand, as in the example. It can be used for a cymbal stand, or a snare drum, or a chair for a drum, etc.

The tip structure of the support leg of the invention can prevent any possible shift by causing the spike bar to stick out of each end cap, which constitutes one point of support for the high hat stand. In addition, the high hat stand can be supported stably at all times. Moreover, its adjustment can be carried out extremely easily using one hand.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A tip structure for a support leg for a stand, comprising:

a support leg having a main part with a bottom region toward the bottom of the leg, and a bottom opening into the main part from the bottom of the leg for receiving a bar within the opening in the main part, the main part having a side with an elongated hole which extends in the length direction of the main part, the elongated hole communicating with the bottom opening into the main part;

an end cap for the leg fitted around the bottom region of the main part of the leg, and a second opening in the end cap corresponding to and aligned with the bottom opening in the leg, the end cap having a side with an elongated adjustment groove that corresponds to and overlies the elongated hole in the leg;

a bar having a tip, the bar being inserted into the bottom opening in the main part of the leg, and the bar being moveable in the bottom opening in the leg and through the second opening in the cap so as to selectively protrude to different distances outside the second opening in the cap;

an adjustment screw extending through the elongated adjustment groove and through the elongated hole and engaging the bar for being tightened to set the position of the bar and the distance it protrudes through the second opening in the cap, and for being loosened to permit the bar to be moved in the bottom opening in the leg and to adjust the distance that the tip of the bar protrudes from the second opening in the end cap.

2. The structure of claim 1, wherein the end cap further includes a ground engaging region around the second opening which is adapted for engaging the surface by which the stand is supported.

3. The structure of claim 1, wherein the leg includes a further part above the main part which supports an object.

4. The structure of claim 3, wherein the support leg is part of a stand for a musical instrument, in which the musical instrument is supported on the stand.

5. The structure of claim 1, wherein the bar is a spike bar and the tip of the spike bar is a spike.

6. The structure of claim 1, wherein the screw extends completely through the bar.

7. A stand for a musical instrument comprising:

a main support for resting on the ground;

two support legs attached to the main support, the two legs extending so as to be spaced away from the main support and from each other, whereby the main support is supported by the two legs and by itself;

each support leg includes an end cap installed on a bottom end of the leg, and a moveable bar received in the end cap, the moveable bar having a tip, wherein the bar is fixable by an adjustment screw such that the tip can be selectively fixed to be either outside or inside the end cap; and a musical instrument supported on the main support.

8. The stand of claim 7, wherein the musical instrument comprises a cymbal and the stand further comprises operating means for the cymbal located on the main support.

* * * * *